(12) United States Patent
Harari et al.

(10) Patent No.: US 7,050,087 B2
(45) Date of Patent: May 23, 2006

(54) DATA ACQUISITION AND DISPLAY SYSTEM AND METHOD

(75) Inventors: Yuval Harari, Emek Soreq (IL); Eran Kaplan, Rehovot (IL)

(73) Assignee: Bioview Ltd., Nes Ziona (IL)

( * ) Notice: Subject to any disclaimer, the term of this patent is extended or adjusted under 35 U.S.C. 154(b) by 0 days.

(21) Appl. No.: 09/729,787

(22) Filed: Dec. 6, 2000

(65) Prior Publication Data

US 2002/0067409 A1  Jun. 6, 2002

(51) Int. Cl.
*H04N 7/18* (2006.01)

(52) U.S. Cl. ..................................................... 348/80

(58) Field of Classification Search ................. 250/585; 348/61, 79, 80, 87, 139; 356/39, 390, 317; 359/358; 382/133–134, 128, 284, 294, 305; 600/426; 435/6, 7.1; H04N 7/18
See application file for complete search history.

(56) References Cited

U.S. PATENT DOCUMENTS

| | | | | |
|---|---|---|---|---|
| 3,785,714 A | * | 1/1974 | Hock et al. ................. 356/390 |
| 4,806,776 A | * | 2/1989 | Kley .......................... 348/139 |
| 5,541,064 A | * | 7/1996 | Bacus et al. ................ 382/134 |
| 5,624,798 A | * | 4/1997 | Yamamoto et al. ............ 435/6 |
| 5,627,913 A | * | 5/1997 | Spigarelli et al. ............. 348/87 |
| 5,795,295 A | * | 8/1998 | Hellmuth et al. ........... 359/358 |
| 5,823,958 A | * | 10/1998 | Truppe ....................... 600/426 |
| 5,939,278 A | * | 8/1999 | Boon et al. .................. 435/7.1 |
| 6,025,601 A | * | 2/2000 | Trulson et al. .............. 250/585 |
| 6,101,265 A | * | 8/2000 | Bacus et al. ................ 382/133 |
| 6,148,096 A | * | 11/2000 | Pressman et al. ........... 382/133 |
| 6,226,392 B1 | * | 5/2001 | Bacus et al. ................ 382/128 |
| 6,272,235 B1 | * | 8/2001 | Bacus et al. ................ 382/284 |
| 6,529,271 B1 | * | 3/2003 | Engelhardt .................. 356/317 |

\* cited by examiner

*Primary Examiner*—Richard Lee

(57) ABSTRACT

A data acquisition and display system comprises: a data acquisition device, such as a camera, microscope, telescope, thermal imager, medical scanning device, radar etc, operable to acquire data in scans over a field of interest using each of at least a first and a second data acquisition method. A field data storage device stores the field data together with corresponding field location data that describes a location within the field of interest. A field data display device such as a screen is operable to display simultaneously data from matched locations in the field of interest acquired respectively by the different data acquisition methods. The data, generally image data, may be superimposed or displayed side by side as desired. Preferably, one of the images being displayed is live whilst the other is recalled from the field data storage device.

2 Claims, 5 Drawing Sheets

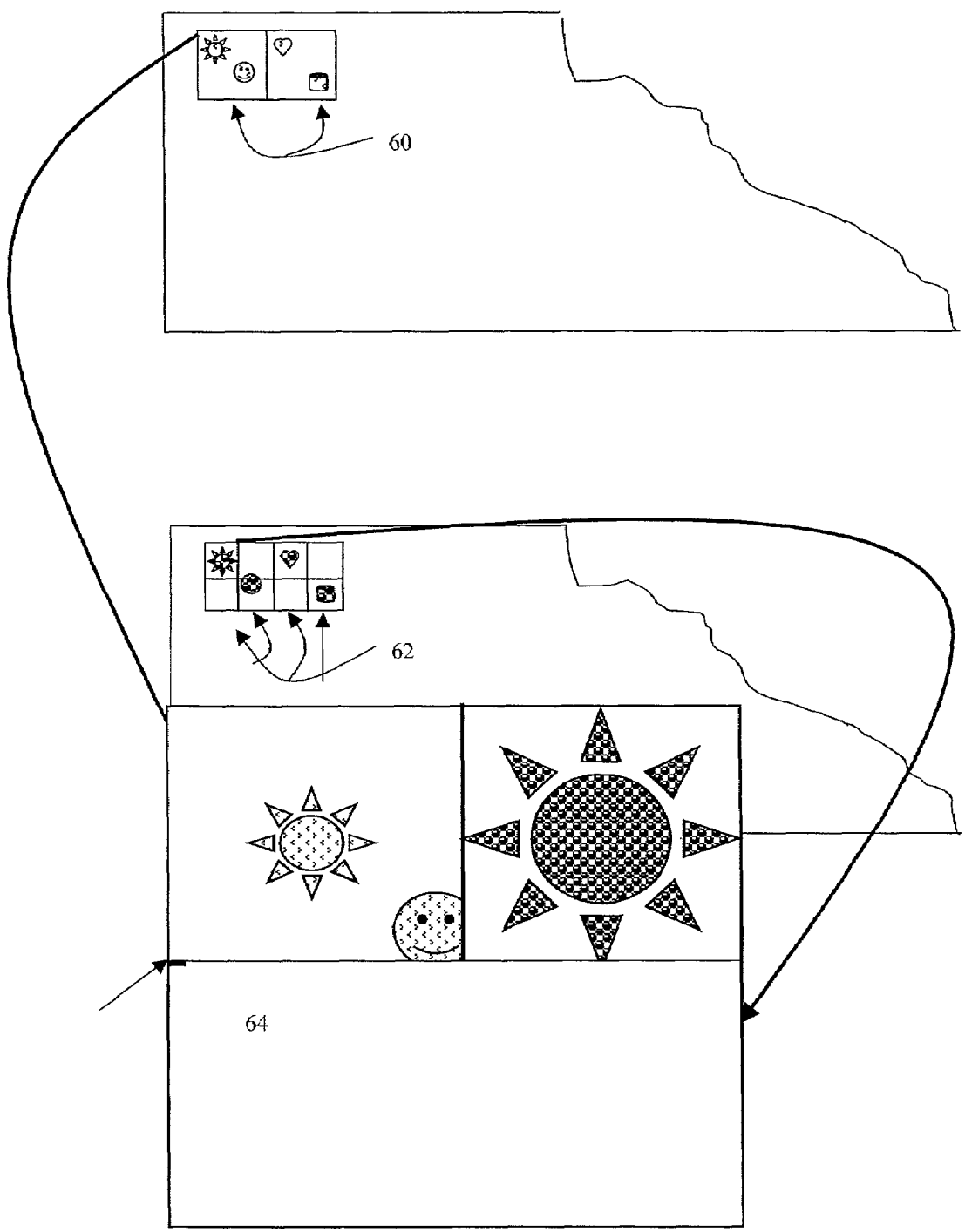

DATA ACQUISITION AND DISPLAY SYSTEM AND METHOD

FIELD OF THE INVENTION

The present invention relates to a data acquisition and display system and method and more particularly, but not exclusively, to an image data acquisition display system.

BACKGROUND OF THE INVENTION

In data gathering technology, and more particularly in image gathering technology, it is possible to image a given view using a number of different image gathering techniques. For example, a standard light microscope may be able to image a slide using bright field illumination and dark field illumination. Alternatively the same microscope may be used to view the same field of view using the same illumination conditions but with different light filters. A standard camera may similarly view a scene using different filters or under different illumination conditions or at different times.

The above applies to all types of image gathering techniques, including all types of electron and conventional microscopes, cameras, telescopes for all kinds of wavelengths, radar, thermal imaging devices, image intensifiers, laser ranging devices and medical imaging devices including for example, magnetic resonance imaging devices or scanners, PET scanners, x-ray devices, etc. Electron microscopes include for example scanning electron microscopes, transmission electron microscopes, and telescopes include reflecting and refracting telescopes as well as radio telescopes and x-ray and gamma ray telescopes. The devices may include high precision devices using CCD technology for image detection.

Furthermore it is often desirable to image a large field of interest which is larger than the maximum field that the device is able to image at any one time. In this case, the image is therefore viewed in parts or sections. If the field of interest is then re-imaged using a different imaging method then it is often desirable to view simultaneously the same part imaged using the two methods. It is often further desirable that one of the two images being viewed should be one that is currently being imaged. It may be desirable to view the two images side by side or alternatively to superimpose one upon the other.

The imaging device may be able to image the field of interest using any number of imaging methods. In such a case it may be desirable to view each corresponding image from each method simultaneously.

The field of interest may be an area that is too large to image all, at once or it may be a depth of field that cannot be imaged at once. Alternatively, it may be a field that varies over time or any combination of the above.

Imaging is carried out using terrestrial-based platforms, airborne platforms and space-based platforms. The same considerations apply to all of these cases.

SUMMARY OF THE INVENTION

Embodiments of the present invention preferably provide a user with the possibility of moving over a field of interest with an imaging device to image the field of interest using one imaging method, whilst simultaneously and automatically being shown one or more images of the same part of the field previously obtained using the same or a different imaging method, this latter image being automatically replaced as the imaging device moves over the field of interest.

According to a first aspect of the present invention there is thus provided a data acquisition and display system comprising at least one data acquisition device, operable to acquire field data of a presently viewed field having field location data, from a scannable field of interest using each of at least a first and a second data acquisition method, a field data storage device for storing said field data together with said corresponding field location data, and a field data display device being operable to display simultaneously field data of said presently viewed field, acquired respectively by said first and said second data acquisition method, said field data being matchable by said field location data.

Preferably, the field data comprises image data.

Preferably, the scannable field of interest is substantially larger than said presently viewed field such that a plurality of viewed fields are required to cover said scannable field of interest.

Preferably, said scannable field of interest is substantially larger than said presently viewed field such that a plurality of viewed fields are required to cover said scannable field of interest.

Preferably, said field data storage device is operable to store image data of said entire scannable field of interest acquired according to said first data aqcuisition method.

Preferably, said data acquisition device is operable to acquire image data of a presently viewed field of view using said second data acquisition method and said field data display device is operable to display said image data in conjunction with a corresponding image acquired using said first data acquisition method.

Preferably, said data acquisition device is a microscope.

Preferably, said data acquisition device is a microscope and said microscope microscope is any one of a group comprising a light microscope, a scanning electron microscope and a transmission electron microscope Alternatively, said data acquisition device is a telescope.

Preferably, said telescope is any one of a group comprising a refracting telescope, a reflecting telescope, an infra-red telescope, a radio telescope, a gamma-ray telescope, and an x-ray telescope.

Preferably said data acquisition device is terrestrially based.

Alternatively, said data acquisition device is suitable for being airborne.

As a further alternative, said data acquisition device is suitable for being spaceborne.

According to a second aspect of the present invention there is provided an image data storage device storing image data of a plurality of parts of a scannable field of interest together with location data of said part within said scannable field of interest.

According to a third aspect of the present invention there is provided an acquisition and display coordinator for co-ordinating between at least one image data acquisition device, operable for acquiring image data according to at least two data acquisition methods, and a data display device, said coordinator being operable to store image data obtained using a first data acquisition method together with location data of said image within a scannable field of interest, and to display said image simultaneously with an image having similar location data acquired using a second data acquisition method.

Preferably, said scannable field of interest is substantially larger than a presently viewed field such that a plurality of viewed fields are required to cover said scannable field of interest.

A preferred embodiment is preferably operable to store image data of said entire scannable field of interest acquired according to said first data acquisition method.

Preferably, said data acquisition device is operable to acquire image data of a presently viewed field of view using said second data acquisition method and said field data display device is operable to display said image data in real time in conjunction with said corresponding image acquired using said first data acquisition method.

Preferably, said data acquisition device is a microscope.

In one alternative, said microscope is any one of a group comprising a light microscope, a scanning electron microscope and a transmission electron microscope.

Alternatively, said data acquisition device is any one of a group comprising a thermal imager, an image intensifier, a telescope, a camera, and a radar.

Preferably, said telescope is any one of a group comprising a refracting telescope, a reflecting telescope, an infra-red telescope, a radio telescope, a gamma-ray telescope, and an x-ray telescope.

In one embodiment, said data acquisition device is terrestrially based.

Alternatively, said data acquisition device is suitable for being airborne.

As a further alternative, said data acquisition device is suitable for being spaceborne, for example being satellite-mounted.

Preferably, the coordinator is operable to position said data acquisition device.

Preferably, said location data additionally comprises focussing data for defining a focal plane.

The coordinator preferably comprises software on computer readable media for installation on a computer operatively associated with said data acquisition device.

According to a fourth aspect of the present invention there is provided an acquisition and display coordinating method comprising the steps of:
 acquiring first data of a field of view within a field of interest being scanned using a first data acquisition method,
 storing said data together with field location data of said field of view within said field of interest being scanned,
 subsequently acquiring second data of a corresponding field of view within said field of interest being scanned using a second data acquisition method, and
 retrieving said first data using said field location data and simultaneously displaying said first data and said second data.

Preferably, said first data and said second data are first and second images respectively.

Preferably, said simultaneously displayed first and second images are superimposed one on the other.

Preferably, said simultaneously displayed images are displayed side by side.

Preferably, said data is acquired using any one of a group comprising a thermal imager, a microscope, an image intensifier, a telescope, a camera, and a radar.

Preferably, said microscope is any one of a group comprising a light microscope, a scanning electron microscope and a transmission electron microscope.

Preferably, the telescope is any one of a group comprising a refracting telescope, a reflecting telescope, an infra-red telescope, a radio telescope, a gamma-ray telescope, and an x-ray telescope.

Preferably, said data acquisition device is one of group comprising a telescope and a thermal imaging device, operable to gather data at a plurality of different wavelengths and wherein each data acquisition method comprises gathering data at a different one of said wavelengths.

According to a fifth aspect of the present invention there is provided a method of display of data acquired in at least two data acquisition methods from a scannable field of interest comprising:
 scanning the field of interest using a first data acquisition method,
 forming a plurality of first images of said field of interest,
 indexing said images,
 storing said indexed images,
 scanning the field of interest using a second data acquisition method to form at least one second image corresponding to one of said first images,
 determining from the indices which of said first images corresponds to said second image,
 simultaneously displaying said second image and said corresponding first image.

According to a sixth aspect of the present invention there is provided a method of display of data acquired in at least two data acquisition methods from a scannable field of interest comprising:
 scanning the field of interest using a first data acquisition method,
 forming a plurality of first images of said field of interest,
 indexing said images,
 storing said indexed images,
 scanning the field of interest using a second data acquisition method to form at least one second image corresponding to an index of a predetermined one of said first images, and
 simultaneously displaying said second image and said corresponding first image.

According to a seventh aspect of the present invention there is provided a method of constructing an image gathering and display coordination system, the method comprising,
 providing an image gathering device operable to gather image data, using a plurality of image gathering methods, according to externally provided positioning commands,
 providing an image storing device and connecting said image storage device to said data gathering device such that it is able to store data gathered from said image gathering device in association with said externally provided positioning commands corresponding to said data, and
 providing an image display device for simultaneously displaying a plurality of images gathered using different image gathering methods but with identical positioning commands.

Preferably, said image display device is operable to display at least one image from said storage device together with one image direct from said image gathering device.

According to an eighth aspect of the present invention there is provided a control system for controlling an image data acquisition device, operable for acquiring image data according to at least two data acquisition methods, and a data display device, said control system being operable to store image data obtained using a first data acquisition method together with location data of said image within a scannable field of interest, and to display said image simultaneously with an image having similar location data acquired using a second data acquisition method.

According to a ninth aspect of the present invention there is provided a control system for controlling an imaging device and a display device together to permit a user to move over a field of interest with said imaging device to image the field in parts using one imaging method, and to display a current part on said display device whilst simultaneously and automatically displaying a second image of a same part of the field previously obtained using a different imaging method, the second image being automatically replaced as the imaging device moves to a different part of the field of interest.

Preferably, the imaging device is operable to image said field of interest using at least three imaging methods and wherein said display device is operable to display simultaneously all images of a part of said field of interest currently being viewed.

According to a tenth aspect of the present invention there is provided a data acquisition and display system comprising at least one data acquisition device, operable to scan a field of interest and acquire field data of parts having field location data, from said scannable field of interest using each of at least a first and a second data acquisition method, a field data storage device for storing said field data together with said corresponding field location data, and a field data display device being operable to display simultaneously field data, acquired respectively by said first and said second data acquisition method, said field data being matchable by said field location data.

According to an eleventh aspect of the present invention there is provided a method of applying an intrinsic co-ordinate system to a mount-and-object system, the method comprising:

identifying a plurality of edge points in said mount and object system using automatic image processing, interpolating straight lines between said edge points, identifying two perpendicular straight lines from said interpolated straight lines, identifying a meeting point between said perpendicular straight lines, and defining said meeting point as an origin for said intrinsic co-ordinate system.

Preferably, the mount-and-object system has a substantially rectangular outline.

According to a twelfth aspect of the present invention there is provided a method of imaging a mount-and-object system using an internal co-ordinate system, comprising the steps of:

identifying a plurality of edge points in said mount and object system using automatic image processing, interpolating straight lines between said edge points, identifying two perpendicular straight lines from said interpolated straight lines, identifying a meeting point between said perpendicular straight lines, defining said meeting point as an origin for said intrinsic co-ordinate system, making a plurality of images at different locations on said mount-and-object system, and indexing said images based on its respective location expressed in terms of said intrinsic co-ordinate system.

Preferably, the mount-and-object system is substantially rectangular.

The method preferably comprises a further step of fine registration between two series of said images of the same mount-and-object system, comprising the steps of identifying an identical feature on each series of images, placing a cross-hair on said identical feature on each series of said images, and defining the center of the cross hair as being the same location on each set of images so as to modify the intrinsic co-ordinate system.

BRIEF DESCRIPTION OF THE DRAWINGS

For a better understanding of the invention and to show how the same may be carried into effect, reference will now be made, purely by way of example, to the accompanying drawings, in which:

FIG. 6 is a simplified diagram showing a slide stained under two sets of conditions, the two sets of conditions being shown side by side on a PC monitor under different magnification.

DESCRIPTION OF THE PREFERRED EMBODIMENTS

Embodiments of the present invention generally provide a data acquisition and display system which comprises:

a data acquisition device, such as a camera, microscope, telescope, thermal imager, medical scanning device, radar etc., operable to acquire data in scans over a field of interest using each of at least a first and a second data acquisition method, a field data storage device, which stores the field data together with corresponding field location data that describes a location within the field of interest, and a field data display device such as a screen, which is operable, to display simultaneously data from matched locations in the field of interest acquired respectively by the different data acquisition methods.

The data, generally image data, may be superimposed or displayed side by side as desired. Preferably, one of the images being displayed is live whilst the other is recalled from the field data storage device. In the event that a large number of different imaging techniques is used, a stored image relating to each one of the techniques or any subset of the techniques, may be displayed, preferably alongside a live, that is to say current, image.

Figure 1:
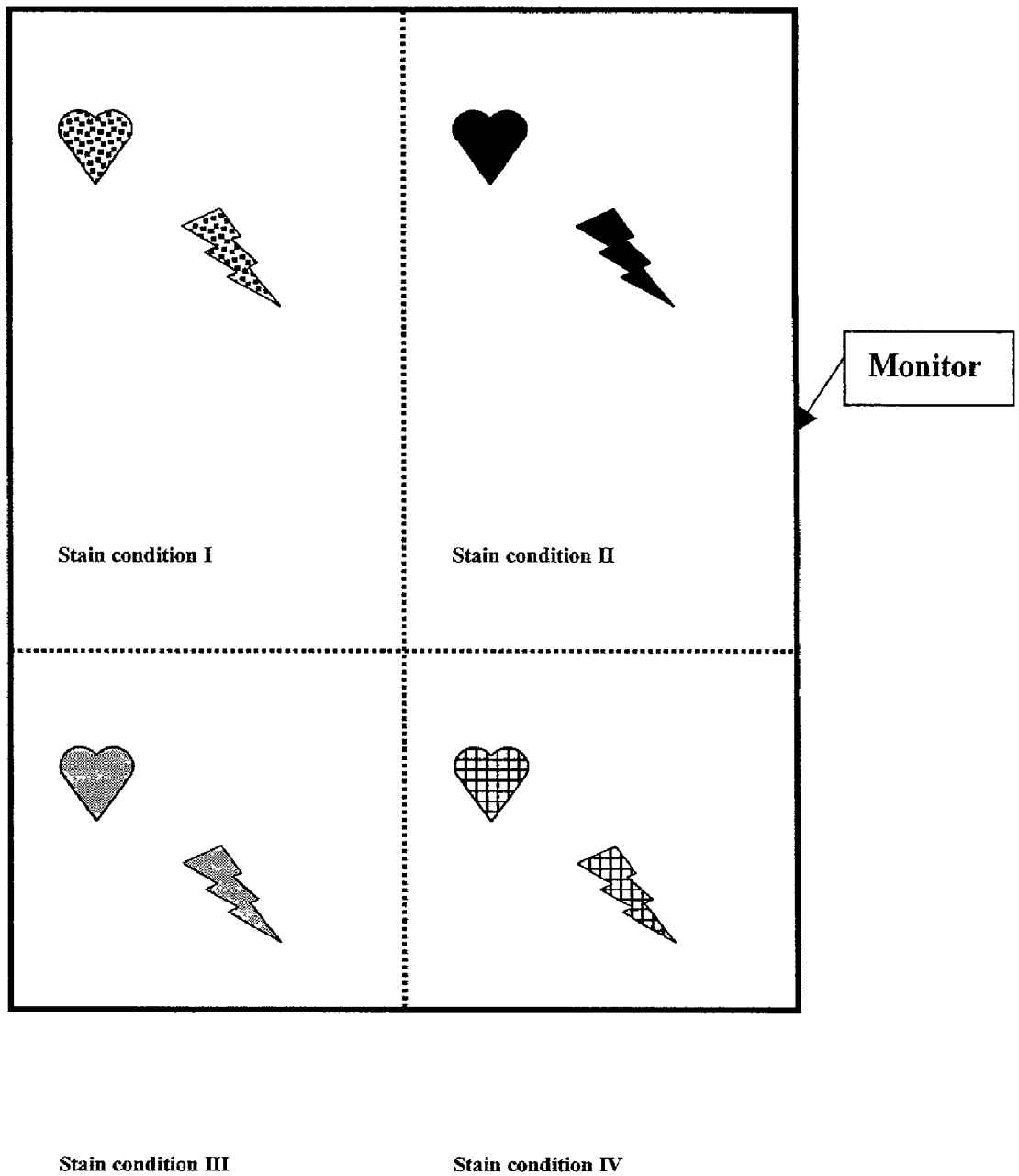
FIG. 1 is a schematic diagram which shows a series of four images produced of the same part of a microscope slide using different staining techniques.

Reference is now made to FIG. 1, which shows a coordinated image display according to a first embodiment of the present invention. A monitor display 10 shows simultaneously a sequence of four images 12, 14, 16 and 18 of the same object taken using a microscope, each image being taken under different staining conditions. All four of the images may have been taken previously and been recalled from memory or one of the images may be of a direct view through the microscope. The four images may be views of the entire field of interest, in which case it is relatively easy to co-ordinate the images. However, the field of interest may be considerably larger than an individual image. For example it may be desirable to view an entire slide, in which case there may be, depending on the magnification employed, several tens, hundreds or thousands of images taken with each staining technique. Thus, as the microscope moves across the slide, carrying out imaging using one of the techniques, it is necessary to update the remaining three views by selecting between a large number of other images. As will be described in more detail below, this may be achieved by associating each image with location data describing the location of the microscope as the image was taken. The image is stored with the location data and is recalled subsequently when the microscope carries out further imaging at the same location.

Although FIG. 1 shows images being displayed side by side, it may be desirable in many circumstances to superimpose the images.

The skilled person will be aware that there are a number of techniques for superimposition. The background color may be deleted to leave it transparent and then, for example, two images may simply be placed upon one another so that areas that are stained in both images appear as a mix of the two colors. Alternatively it is possible to identify the areas stained by the two images and to assign to them a different color.

Figure 2:
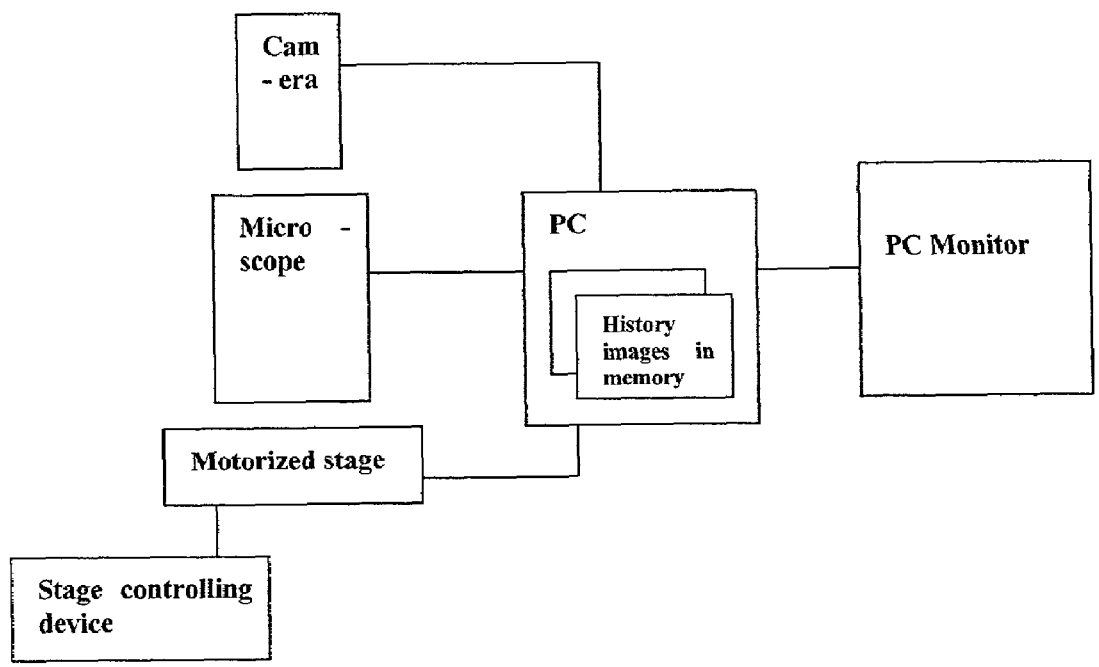
FIG. 2 is a generalized block diagram showing a first embodiment of the present invention.

Reference is now made to FIG. 2, which is a simplified block diagram showing an apparatus for providing the coordinated images of FIG. 1. A microscope 20 is associated with a camera 22. Microscope 20 produces images of slides located on a motorized stage 24, which the camera records. The camera 22 preferably records the image in digital form. Motorized stage 24 is operated by a stage controlling device 26 to move the stage so that, for example, different parts of the stage can be viewed and so that slides or parts of slides may be brought into focus.

A controller PC 28 is connected preferably to camera 22, and to motorized stage 24, such that it is able to determine the location of the stage at the time that image data is obtained. In addition it is able to gather image data from camera 22, which may be a digital camera, for example a color CCD camera, and to store the image data in conjunction with the location information obtained from motorized stage 24. The image data, associated with the location data, is preferably stored in a memory 30. As the image data is being obtained it may also be displayed on monitor 32.

Preferably, microscope 20 scans the slide to produce a series of images which comprehensively cover anything of interest on the slide. Then, a new imaging technique is used and the slide is scanned again. Images from the second scan that correspond to images from the first scan are readily identifiable as they are stored with the same location information. Thus, during the second scan, it is possible, for each image being obtained, to co-display the image with the corresponding image from the first scan.

The second scan may be followed by a third scan, using a third imaging technique, and as each image is obtained in the third scan, it may be displayed on monitor 32 in conjunction with the corresponding images from the first and second scans, and likewise with fourth and further scans using further imaging techniques. Thus the user may travel across a field of interest and obtain automatic updating of corresponding images and the present embodiment therefore provides an ability to scan a slide and automatically see an object under a plurality of sets of conditions.

The different sets of conditions may include variations in illumination method, filters, applied stain or marker, plane of focus or depth of focus. Numerous other possibilities for variations will be apparent to the skilled person.

As mentioned above, a standard light microscope may be able to image a slide using bright light illumination and staining and also using fluorescent illumination and staining. Alternatively the same microscope may view the same image using the same illumination conditions but with different staining conditions and using different light filters. A standard camera may similarly view a scene using different filters or under different illumination conditions or at different times.

In the above description of FIG. 2, the computer 30 has been described simply as observing the location from which an image is obtained. The scan itself is therefore carried out by the user directly operating microscope controls, for example a joystick or the like. However, in an alternative embodiment, the computer controls movement of the motorized stage 24, thus carrying out a pre-programmed scan. In this case, computer 30 may well be connected to stage control device 26 as well as to the motorized stage 24 itself.

In the above description the simultaneous display of live and stored images has been described. In one particular embodiment a stored image may be selected and the location data with the image may be used to automatically position the microscope to obtain another corresponding image.

In an alternative embodiment there may be provided a separation between image gathering and the display functions such that sets of images are obtained and correspoding images from the sets are displayed together without live images being used.

Figure 3:
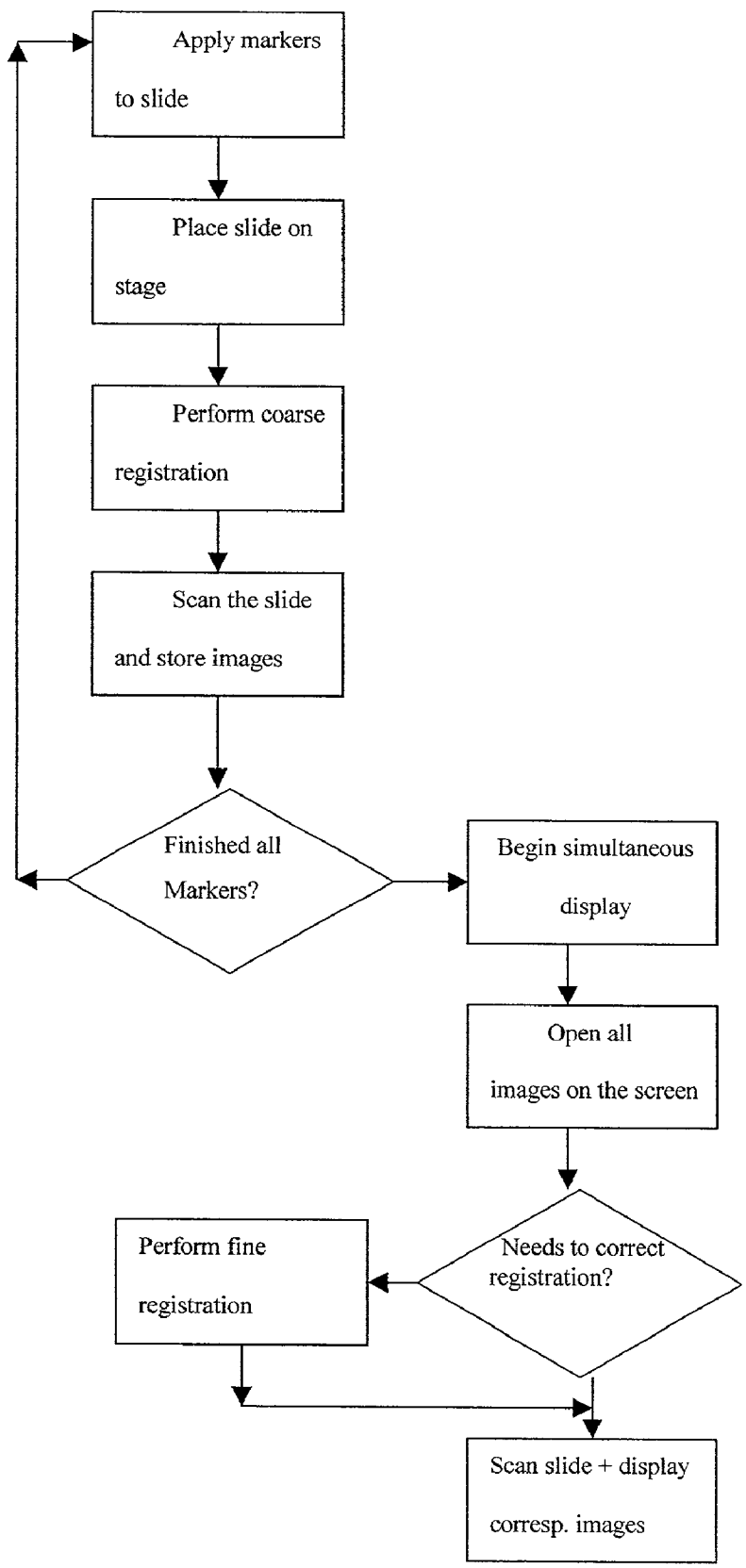
FIG. 3 is a simplified flow diagram describing the operation of an embodiment of the present invention.

Reference is now made to FIG. 3, which is a simplified flow diagram showing an image gathering and display procedure for use with the present invention. Firstly, in a step SI, a marker is applied to a sample on a slide. In step S2 the slide is placed on motorized stage 24 and then a step S3 of coarse registration is preferably carried out. The coarse registration step will be described in more detail below in conjunction with FIG. 4. In step S4, the slide is scanned and a series of images are produced and stored. Steps 1 to 4 are repeated using a different marker until all required markers have been used. If all required markers have been used, step S5, then simultaneous display is begun, step S6. The slide is mounted on stage 24 once again and in step S7, all the images from each of the sets corresponding to a given location on the slide are opened. If the slide is not correctly registered (step S8) then a step S9 of fine registration may be needed. The step of fine registration will also be described in greater detail below. Then, the slide may be scanned by the microscope and all of the sets of corresponding images may be shown alongside or superimposed on an image being presently viewed (step S10).

Figure 4:
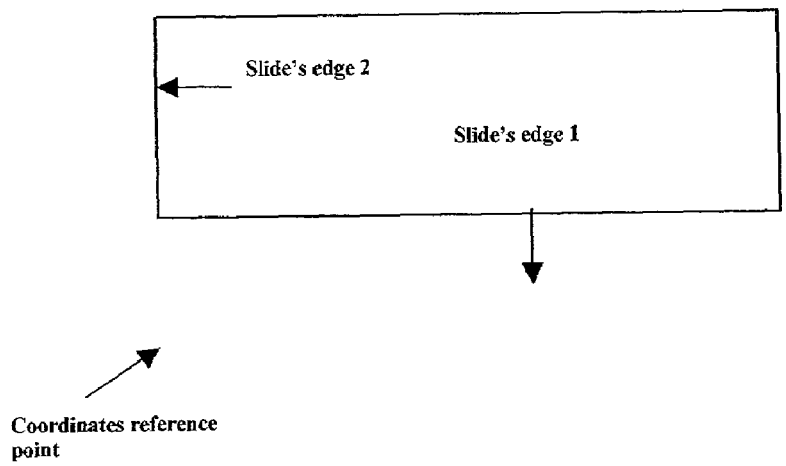
FIG. 4 is a simplified diagram showing the application of an intrinsic co-ordinate system to an embodiment of the present invention.

Reference is now made to FIG. 4 which is a simplified diagram showing how the walls of the slide may provide a reference point for a slide internal co-ordinate system. Whilst it is simple to provide references for a slide which remains in position on the stage 24, the present embodiment seeks to provide a means for accurately identifying positions on a slide which is removed from the stage, for example for washing and restaining, which positions can be found when the slide is inaccurately replaced on the stage.

In FIG. 4 a slide 40 has a first edge 42 and a second edge 44, the first and second edges meeting at a comer 46. Comer 46 is simply used as the origin for an x,y co-ordinate reference system which is intrinsic to the slide and does not depend on the stage or any other part of the image gathering mechanism. The coarse registration process simply identifies the respective first and second edges of the slide and thus their crossing point.

A preferred procedure for obtaining the slide internal co-ordinate system is as follows:

a set of images is taken along the first and second edges of the slide, the co-ordinates of a number of locations along the edges of the slide (relative to the stage 24) are obtained, a linear fit of the co-ordinates to a straight line is obtained for each of the edges, the intersection of the two straight lines is obtained, and the intersection is defined as the origin for the slide's intrinsic coordinate system.

The above procedure is carried out initially to establish the co-ordinate system with respect to the slide and it is repeated every time the slide is replaced. The co-ordinates of individual images are expressed in the slide internal co-ordinate system.

Returning to FIG. 3, and in step S4, as mentioned above, the slide is scanned to produce a series of images, which are digitized and stored in memory along with their respective co-ordinates. The scanning may be in two axes, (x,y) or in three axes (x,y,z). In the former, the computer may control image capture by imaging all of the area of the slide. In the latter, for each part of the slide, focussing at different depths is also carried out. In either case the area scanned may be the entire slide or a subset thereof, herein referred to as the field of interest. In the three axis case there is in effect a three-dimensional representation of the slide stored in the memory (see below FIG. 5).

In step S7, images from previously obtained sets retrieved from the memory are displayed in conjunction with a corresponding live image. This is a separate step from the final display of the images, step S10 as it is partly to ensure that good registration has been provided through the course registration step before display is attempted. A live image being currently seen through microscope 20 is displayed alongside stored images and the user is given an opportunity to ensure that regisitration is sufficiently accurate. If he decides it is not, then he has the opportunity to enter the fine registration procedure. Depending on the image processing technology available to the system, there is the possibility of automatic selection of fine registration.

The fine registration procedure is intended to correct for displacement and rotation errors in the coarse registration scheme in the event that coarse registration has not provided sufficient accuracy of placement. In the fine registration procedure, one of the images is selected as a reference. An object within that image is placed at the center of the screen. The same object is idenfied in corresponding images. A fine registration procedure is then activated, which involves the creation of a cross-hair mark for placement on all ocurrences of the object in the different sets. The cross-hair mark is placed on the objects at the same point and indicating the orientation of the object, and the system is notified that the cross-hair is to be treated as being the same coordinate on all of the image sets. Thus the system is able to correct the internal co-ordinates for translational and rotational errors.

As mentioned above, there are a number of modes of operation. In a first mode, one or more sets of images of the slide have been prestored. The computer controls the microscope to scan over the slide and every time a new live image is selected during the scan, corresponding stored images are displayed.

In an alternative mode of operation, the slide is not scanned automatically but rather the user instructs the microscope to view a given location. The computer then automatically selects stored image s corresponding to the selected location.

In another alternative mode of operation, the user directly controls the microscope to move to a point of interest. The computer follows the location and automatically produces corresponding image data from its memory.

As a further alternative mode of operation, no live image is shown, but rather either of the above modes of moving around the slide is used and all of the images displayed are retrieved from the memory.

Figure 5:
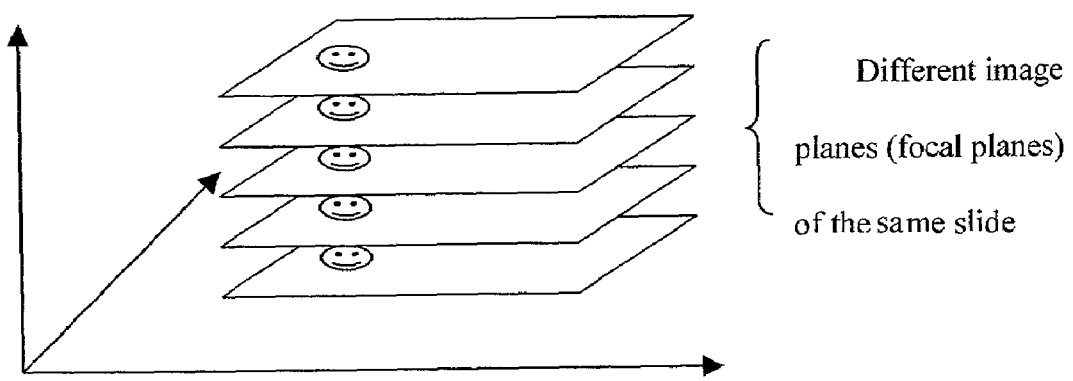
FIG. 5 is a simplified diagram showing a three-dimensional co-ordinate system being applied to the present invention.

Reference is now made to FIG. 5, which shows schematically a series of images taken of a single region of a slide, each image being focussed at a different depth.

As discussed above, it is possible to range across a slide using either two or three dimensions. FIG. 5 schematically illustrates a series of images 50.1 . . . 50.n all focussing at different depths of the object on the slide. In one embodiment, the user is able to view the object simultaneously at different depths, the images from different depths being shown side by side, or superimposed if this makes sense for the type of image.

In an alternative embodiment, the slide is imaged at different depths using a series of imaging techniques, each image being indexed according to location and depth. The slide is then viewed by showing simultaneously a plurality of images taken at the same location and depth and then moving on to another depth or on to another location or both. The images shown simultaneously may either all be stored images, or one of the images may be a live image.

Reference is now made to FIG. 6, which shows how the present invention may be applied to two associated images to provided a coordinated view. A first image 60 shows an area of a slide with one type of staining and one magnification level. A second image 62 shows the same area of the slide imaged using a second type of staining and a second magnification level.

A screen view 64 is then built up using part of the imaged areas from each of the first and second images 60 and 62. The two images are shown at different magnifications.

The above embodiments have been described with respect to the use of a microscope. The skilled person will appreciate, however, that the invention is applicable to other forms of imaging, in particular forms of imaging in which a field of view is smaller than a field of interest and in particular where several methods of photography or other image gathering techniques are applicable.

In astronomy, a field of view which can be imaged by a telescope at a desired level of magnification is often likely to be smaller than a field of interest. Furthermore, simply using a conventional light telescope, it is possible to image the same field of view using a variety of filters or using different exposure times or simply at different times. For example if trying to identify a planetary object against a background of a starfield it is common to photograph the same region of the sky at different times and to superimpose the images. Stellar objects remain relatively fixed whereas solar system objects appear and disappear against the stellar background. Use of the above embodiments allows the user to photograph contiguous regions of the sky, each region being photographed at least twice at different times and then to cycle through the different regions, automatically superimposing the corresponding images, to search for objects in the solar system.

A further embodiment allows for co-ordination between different telescopes or different types of telescopes. For example, one way of photographing the same area of the sky at different wavelengths is to use two or more different telescopes. Use of the above-described embodiments permit simultaneous viewing of the images produced by the different telescopes. As an intrinsic co-ordinate system, such a further embodiment may use the right ascension system of co-ordinates for the sky.

A further application of the present invention concerns medical imaging. Medical imaging equipment includes numerous types of scanners, for example CT, NMR and PET scanners. Each type of scan has its strengths and weaknesses and often the medical practitioner will find it expedient to use the results of more than one technique. The present invention allows images of the body produced using different imaging techniques to be compared easily, as described in respect of the above embodiments.

A further application of the present invention concerns thermal imaging and night time photography. Thermal imaging may for example be used to study the efficiency of insulation of a building. Thus a building may be imaged under different heating conditions and the images compared. This can be done efficiently using embodiments of the present invention.

A further application of the present invention concerns scanning or photographing, particularly of the earth's surface, from the sky or from space. Such scanning may be carried out using different photographic techniques or may comprise photographing the same spots at different times. Embodiments of the present invention allow corrresponding images to be viewed simultaneoulsy, either side by side or superimposed, for efficient comparison.

There is thus provided a data acquisition and display system which comprises: a data acquisition device, such as a camera, microscope, telescope, thermal imager, medical scanning device, radar etc, operable to acquire data in scans over a field of interest using each of at least a first and a second data acquisition method. A field data storage device stores the field data together with corresponding field location data that describes a location within the field of interest. A field data display device such as a screen is operable to display simultaneously data from matched locations in the field of interest acquired respectively by the different data acquisition methods. The data, generally image data, may be superimposed or displayed side by side as desired. Preferably, one of the images being displayed is live whilst the other is recalled from the field data storage device.

In one specific embodiment the present invention can be used for analyzing biological samples. Biological samples, e.g., cells and tissues are in many cases stained prior to analysis. Some (conventional) stains are visualized using transmittance microscopy. Other are visualized using fluorescent microscopy. In many cases it is advantageous to co-stain a single sample with one or more conventional stains and one or more fluorescent stains. The conventional stains are co-viewed using transmittance microscopy. Each of the fluorescent stains is viewed using fluorescent microscopy with the aid of dedicated filters so as to distinguish between stains. This, for example, may be the case in multiple dyes fluorescent in situ hybridization (FISH) used to co-visualize a plurality of genes, entire chromosomes and/or RNA and in fluorescently labeled antibody staining used to co-visualize several cellular markers. The present invention offers means with which a user can easily scan a field of interest and be presented with all the imagery data direvable therefrom simultaneously along the scan.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

What is claimed is:

1. A method of applying an intrinsic co-ordinate system to a mount-and-object system to provide co-ordinated viewing of points on a mounted object imaged using different image gathering processes, the method comprising:

identifying a plurality of edge points of said mounted object in said mount and object system using automatic image processing, interpolating straight lines between said edge points, identifying two perpendicular straight lines from said interpolated straight lines, identifying a meeting point between said perpendicular straight lines, defining said meeting point as an origin for said intrinsic co-ordinate system, identifying a marker from a sample being imaged, using said marker as a fine-tuning reference relative to said origin, and using said co-ordinate system to provide automatic cross-referencing between said points on said object imaged using said different image gathering processes, thereby to provide a co-ordinate reference system which is intrinsic to said mounted object.

2. A method according to claim 1, wherein the mount-and-object system has a substantially rectangular outline.

* * * * *